(12) United States Patent
Manten et al.

(10) Patent No.: US 12,502,850 B2
(45) Date of Patent: Dec. 23, 2025

(54) THERMOPLASTIC COMPOSITE HAVING ONE OR MORE INNER OPENINGS AND METHOD FOR MOLDING SAID COMPOSITE

(71) Applicant: Dutch Thermoplastic Components B.V., Almere (NL)

(72) Inventors: David Reijer Manten, Almere (NL); Dennis Lunenborg, Almere (NL)

(73) Assignee: DUTCH THERMOPLASTIC COMPONENTS B.V., Almere (NL)

( * ) Notice: Subject to any disclaimer, the term of this patent is extended or adjusted under 35 U.S.C. 154(b) by 708 days.

(21) Appl. No.: 17/795,433

(22) PCT Filed: Jan. 28, 2021

(86) PCT No.: PCT/NL2021/050056
§ 371 (c)(1),
(2) Date: Jul. 26, 2022

(87) PCT Pub. No.: WO2021/154078
PCT Pub. Date: Aug. 5, 2021

(65) Prior Publication Data
US 2023/0070857 A1 Mar. 9, 2023

(30) Foreign Application Priority Data
Jan. 28, 2020 (NL) .................................... 2024776

(51) Int. Cl.
*B29C 70/46* (2006.01)
*B29C 51/04* (2006.01)
(Continued)

(52) U.S. Cl.
CPC ............ *B29C 70/461* (2021.05); *B29C 51/04* (2013.01); *B29C 70/46* (2013.01); *B29C 70/541* (2013.01);
(Continued)

(58) Field of Classification Search
CPC ....... B29C 70/46; B29C 70/56; B29C 70/342; B29C 70/345; B29C 70/446;
(Continued)

(56) References Cited

U.S. PATENT DOCUMENTS

| 2008/0169380 A1* | 7/2008 | Jackson | ................ B29C 70/345 244/129.3 |
| 2009/0020217 A1* | 1/2009 | Cano Cediel | ......... B29C 70/545 156/219 |
| 2019/0100252 A1 | 4/2019 | Boettcher | |

FOREIGN PATENT DOCUMENTS

| DE | 102004025383 | 12/2005 |
| DE | 102011012499 | 8/2012 |

(Continued)

*Primary Examiner* — Jerzi H Moreno Hernandez
(74) *Attorney, Agent, or Firm* — MH2 Technology Law Group, LLP

(57) ABSTRACT

A method and mold for forming a thermoplastic composite that has one or more inner openings, and a thermoplastic composite manufactured using such method. Typically, forming of a thermoplastic composite is achieved using a mold comprising a first and second mold part that are moved towards each other for the purpose of forming the thermoplastic composite. The mold further comprises a third mold part that is movably arranged around the one or more first mold parts. Furthermore, an additional step is used of clamping the outer part in between the second and third mold parts during the mutual movement of the first and second mold parts while allowing the one or more inner parts to move relative to the one or more first mold parts thereby increasing the one or more inner openings, respectively.

9 Claims, 8 Drawing Sheets

(51) Int. Cl.
*B29C 70/54* (2006.01)
*B29C 70/56* (2006.01)
*B29L 31/00* (2006.01)

(52) U.S. Cl.
CPC ......... *B29C 70/56* (2013.01); *B29L 2031/005* (2013.01)

(58) Field of Classification Search
CPC ... B29C 70/461; B29C 70/462; B29C 70/541; B29C 70/549; B29C 51/04; B29C 51/087; B29L 2031/005; B64C 1/1492
See application file for complete search history.

(56) References Cited

FOREIGN PATENT DOCUMENTS

| | | |
|---|---|---|
| EP | 0755769 | 1/1997 |
| EP | 1393875 | 3/2004 |
| EP | 2957775 | 12/2015 |
| WO | 2006069989 | 7/2006 |

\* cited by examiner

THERMOPLASTIC COMPOSITE HAVING ONE OR MORE INNER OPENINGS AND METHOD FOR MOLDING SAID COMPOSITE

BACKGROUND OF THE INVENTION

Field of the Invention

The present invention relates to a method and molding system for forming a thermoplastic composite that has one or more inner openings.

Description of Related Art

Thermoplastic composites consist of a thermoplastic matrix combined with a reinforcing material typically in the form of fibers, such as carbon fibers. Most of the thermoplastic composites comprise multiple layers, wherein each layer comprises fibers that are encapsulated, surrounded, and/or supported by a relatively thin layer of thermoplastic material. Hereinafter, such layer will be referred to as a ply. Generally, there exists a single orientation of the fibers within a single ply.

To realize a thermoplastic composite, multiple plies are arranged on top of each other, wherein the orientation of the fibers changes in the layer stack. For example, a ply stack may comprise a plurality of plies wherein the orientation of the fibers of adjacent plies is orthogonal to each other.

After having arranged the plies into a ply stack, the stack is subjected to a consolidation process in which the thermoplastic material of the ply stack is brought to a temperature above the melting point of the thermoplastic material. Typically, pressure is simultaneously exerted onto the ply stack. Due to the melting of the thermoplastic material, the fibers will be supported by a single substantially integral body of the thermoplastic material.

Generally, an essential flat thermoplastic composite in the form of a sheet is obtained after the consolidation process. Some applications however require the thermoplastic composite to be curved or bent. The process of shaping the thermoplastic composite after consolidation will hereinafter be referred to as forming. This forming may comprise partially bending the thermoplastic composite.

FIGS. 1A and 1B illustrate cross-sectional views related to a known method for forming a thermoplastic composite having a single central inner opening. Prior to forming the thermoplastic composite, it is heated to a temperature above the melting temperature of the thermoplastic material inside the thermoplastic composite allowing the thermoplastic composite to be formed.

FIG. 1A illustrates a mold having a single first mold part 10 and an oppositely arranged second mold part 11. In between mold parts 10, 11, a thermoplastic composite 1 has been arranged. FIG. 1A illustrates an intermediate stage of forming thermoplastic composite 1. Generally, thermoplastic composite 1 is provided as an essentially flat sheet. In FIG. 1A, this sheet has already been partially formed by moving mold parts 10, 11 towards each other. FIG. 1B on the other hand illustrates the final position of mold parts 10, 11.

Thermoplastic composite 1 is provided with an inner opening O and a surrounding region S that surrounds inner opening O. Surrounding region S comprises an inner part L1 directly adjacent inner opening O and an outer part L2. It should be noted that prior to forming, a distinction between inner part L1 and outer part L2 will be difficult or impossible to make as thermoplastic composite 1 is generally provided as a sheet. An example of such a sheet is illustrated in the top view in FIG. 2A.

In the situation illustrated in FIG. 1A, inner part L1 is engaged by first mold part 10 whereas outer part L2 is engaged by second mold part 11. In fact, first mold part 10 pushes or presses inner part L1 in a different direction that the direction in which second mold part 20 pushes or presses outer part L2.

By comparing FIGS. 1A and 1B, it can be seen that during the mutual movement of mold parts 10, 11 for the purpose of forming inner part L1, inner edge E1 of inner part L1 remains essentially fixated relative to first mold part 10. On the other hand, outer edge E2 of outer part L2 moves inwardly. More in particular, the process of forming inner part L1 introduces a pulling force in thermoplastic composite 1 that pulls thermoplastic material inwardly as illustrated by arrows A1 in FIG. 2A.

As can be seen in FIG. 1A, during the initial stages of forming thermoplastic composite 1, inner part L1 is not entirely engaged by first mold part 10. For example, directly adjacent edge E3, which denotes the boundary between inner part L1 and outer part L2, thermoplastic composite 1 is neither engaged by first mold part 10 nor by second mold part 11.

BRIEF SUMMARY OF THE INVENTION

The Applicant has found that forming thermoplastic composites in the manner described above shows an increased risk of wrinkling. This is related to the fact that material moves inwardly to a region having a smaller size or radius. Excess material therefore accumulates and wrinkling in the thermoplastic composite may occur.

FIG. 2B illustrates the problem of wrinkling for a thermoplastic composite window frame 30 when the known method for forming is applied. More in particular, wrinkles 31 can be identified in the inner part L1. Such wrinkles may deteriorate the structural integrity of the windows frame and may cause unwanted risks when used in an airplane.

This same problem equally applies when forming a thermoplastic composite having multiple inner openings. An example of a sheet 1 of thermoplastic composite to be formed is illustrated in FIG. 2C. As shown, sheet 1 comprises multiple inner openings O_1-O_4, which may have a different size and/or shape. In this case, the surrounding region comprises multiple inner parts directly adjacent multiple inner openings O_1-O_4, respectively, and a common outer part L2. In FIG. 2C, edges E31-E3_4 are indicated that mark the boundaries between the inner parts that correspond to inner openings O_1-O_4 and common outer part L2.

Instead of a single first mold part, the mold for forming sheet 1 may comprise multiple first mold parts for inner openings O_1-O_4, respectively. The multiple inner parts may be engaged using the multiple first mold parts in a manner similar to that described in FIGS. 1A and 1B. Similar to FIG. 2B, when applying the known method for forming a thermoplastic composite wrinkling may occur in the inner parts directly adjacent inner openings O_1-O1_4.

WO 2006/069989A1 discloses a method for forming a composite. This patent application discloses process for making swaged lighting holes in planar areas of parts (5) made of pre-impregnated composite, by means of which the part is arranged between a female tooling with the final shape of the bottom side of the swaged part and a caul plate with the final shape of the top side of the swaged part, except in an area which must be swaged. Pressure is applied on the caul plate in the area of the part that must be maintained substantially planar, and a pressure is applied by means of a male tooling on the area of the part which must be swaged at a forward speed allowing the flow of the resin during the slippage of the fibers of the material so that it may deform, adapting to the final shape of the female tooling.

DE 10 2011 012499 A1 discloses mold having an upper tool and a lower tool that are provided for forming a mold hollow space, where the height of the hollow space is varied based on local natural strain. The upper tool and/or the lower tool has a base plate, and an additional segment is supported in the base plate in a pivotable manner by a spring element. The additional segment projects into the hollow space. A tensioning frame is movable separately from the upper tool and/or the lower tool in a vertical direction, and a heating device heats the upper tool and/or the lower tool.

An object of the present invention is to provide a method for forming a thermoplastic composite having one or more inner openings in which the abovementioned problem does not occur or at least to a lesser extent.

According to the invention, this object is achieved using the method as defined in claim 1, wherein the mold further comprises a third mold part movably arranged around the one or more first mold parts. According to the invention, the method comprises the step of clamping the common outer part in between the second and third mold parts during the mutual movement of the first and second mold parts while allowing the one or more inner parts to move relative to the one or more first mold parts thereby increasing the one or more inner openings, respectively.

Similar to the known method, the one or more inner parts are formed by mutually moving the first and second mold parts, i.e. by moving the first and second mold parts relative to each other. However, during this movement, the outer part is clamped using the third and second mold parts. During this clamping, the second and third mold parts do not move relative to each other although the first and second mold parts are mutually moving. This is made possible by having the third mold part movably arranged around the one or more first mold parts.

Contrary to the known method, the outer part is fixated due to the clamping, and the one or more inner parts are allowed to move relative to the one or more first mold parts, respectively. Material therefore moves from a small radius to a larger radius thereby reducing the risk of wrinkles occurring due to an accumulation of excess material.

The first and third mold parts are connected to a supporting frame. In this case, the mold further comprises one or more resilient elements, such as springs, that are arranged in between the supporting frame and the third mold part. Furthermore, the step of mutually moving the first and second mold parts comprises mutually moving the second mold part and the supporting frame while the third mold part is pushed towards the supporting frame by the second mold thereby compressing the one or more resilient elements. More in particular, the one or more resilient elements allow the third mold part to move relative to the one or more first mold parts over a given distance. When compressed, the one or more resilient elements exert a counterforce on the second mold part enabling the thermoplastic composite to be clamped there between.

Mutually moving the first and second mold parts may comprise keeping the second mold part stationary and moving the supporting frame, keeping the supporting frame stationary and moving the second mold part, or moving both the second mold part and the supporting frame.

The method additionally comprises heating the thermoplastic composite to a temperature above a melting temperature of the thermoplastic composite before arranging the heated thermoplastic composite in the mold. Alternatively, the heating to a temperature above the melting temperature may be realized using suitable heating of the mold parts but this would considerably increase the processing time as the thermoplastic composite should also cool down to a temperature well below the melting temperature while it is still arranged in the mold.

The method comprises the step of heating the first, second, and/or third mold parts to a temperature below the melting temperature of the thermoplastic composite. By keeping the temperature difference between the mold parts and the thermoplastic composite within limits, the situation can be avoided in which the thermoplastic composite solidifies too much while not having been (fully) formed. The second and/or third mold part may be kept at a substantially lower temperature than the one or more first mold parts as these former mold parts are responsible for clamping the outer part.

The heated thermoplastic composite that is to be arranged in the mold can be essentially flat, for example in the form of a sheet. However, the present invention is not limited to flat sheets as the method can equally be applied to thermoplastic composites that have been subjected to a previous forming step and/or to non-flat thermoplastic composites. Similarly, the outward surfaces of the various mold parts need not be flat. For example, the sheet of thermoplastic composite may be formed to generate a curvature inside the final product. However, inside this product, the inner parts adjacent the inner openings are formed in the manner described above. Additionally or alternatively, the thermoplastic composite can be made from a consolidated stack of thermoplastic composite plies. For example, the thermoplastic composite may comprise one or more thermoplastic materials from the group consisting of polyolefin, polyamide, polyetherimide, polyphenylene sulfide, polyether ether ketone, polyetherketoneketone, and polyaryletherketone. Additionally or alternatively, the thermoplastic composite may comprise fibers made from one or more material from the group consisting of glass fibers, aramid fibers, basalt fibers, silicon carbide fibers, and carbon fibers.

According to a second aspect, the present invention provides a molding system, comprising a thermoplastic composite having one or more inner openings and a surrounding region that surrounds the one or more inners openings, and a mold for forming the thermoplastic composite. The mold comprises one or more first mold parts and a second mold part in between which the heated thermoplastic composite can be arranged, wherein the surrounding region comprises one or more inner parts directly adjacent the one or more inner openings, respectively, and a common outer part, each inner part having an inner edge, and the common outer part having an outer edge. The one or more first mold parts are configured for engaging the one or more inner parts, respectively, and wherein the second mold part is configured for engaging the common outer part, respectively. The one or more first and second mold parts are configured for allowing the one or more first and second mold parts to mutually move for the purpose of forming the one or more inner parts.

The mold further comprises a third mold part that is movably arranged around the one or more first mold parts, wherein the third mold part and the one or more first mold parts are configured for mutual movement enabling the outer part to be clamped in between the second and third mold parts during the mutual movement of the first and second mold parts. The mold is further configured to allow, during the mutual movement of the first and second mold parts, the one or more inner parts to move relative to the one or more first mold parts thereby increasing the one or more inner openings, respectively.

The mold comprises a supporting frame to which the first and third mold parts are connected, wherein one or more resilient elements, such as springs, are arranged in between the supporting frame and the third mold part. The one or more first mold parts are preferably configured to be connected to the supporting frame in a substantial identical manner so that they move in an identical manner. These mold parts may however be shaped differently to allow the thermoplastic composite near the various inner openings to formed differently. The supporting frame and the second mold part are configured for allowing mutual movement while the third mold part is pushed towards the supporting frame by the second mold thereby compressing the one or more resilient elements.

At most one of the second mold part and the supporting frame can be kept stationary while moving the remaining one(s) of the second mold part and the supporting frame.

The second mold part may comprise one or more inner recesses configured for partially receiving the one or more first mold parts, respectively, an outer region for engaging the third mold part, albeit via the thermoplastic composite, and an intermediate region connecting the inner recesses and the outer region. Typically, the intermediate region and an edge of the one or more first mold parts are chamfered, wherein the chamfering of the intermediate region is arranged opposite to the chamfering of the edges of the one or more first mold parts. The thermoplastic composite is formed at least inside the intermediate region.

The mold may further comprise a drive system for moving the one or more first mold parts, the second mold part, the third mold part, and/or the supporting frame. The mold is controlled by an internal or external controller comprised by the molding system, wherein the controller is configured for controlling the heating means and optionally for further controlling the drive system. The controller is configured for implementing the method as described above.

It should be noted that the mold is preferably configured for implementing the method as described above. Similarly, the method is preferably such that it can be implemented using the mold as described above. Consequently, features described in connection with the method can equally be applied or used in the mold or parts thereof, and vice versa.

BRIEF DESCRIPTION OF THE SEVERAL VIEWS OF THE DRAWINGS

Next, the present invention will be described in more detail referring to the appended drawings, wherein.

DETAILED DESCRIPTION OF THE INVENTION

Figure 3A:
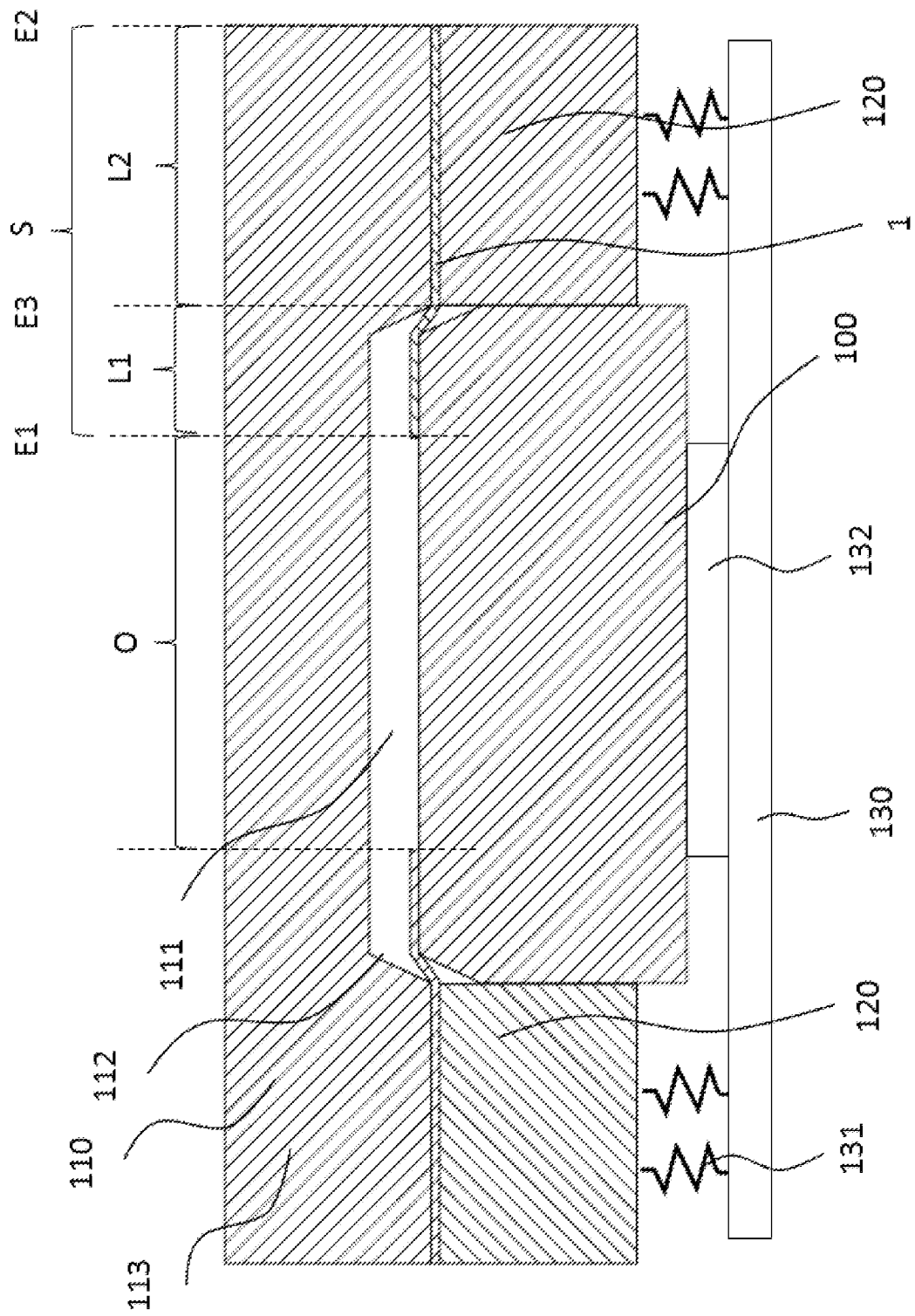
FIGS. 3A and 3B illustrate cross-sectional views related to a method for forming thermoplastic composites in accordance with the present invention.
Figure 3B:
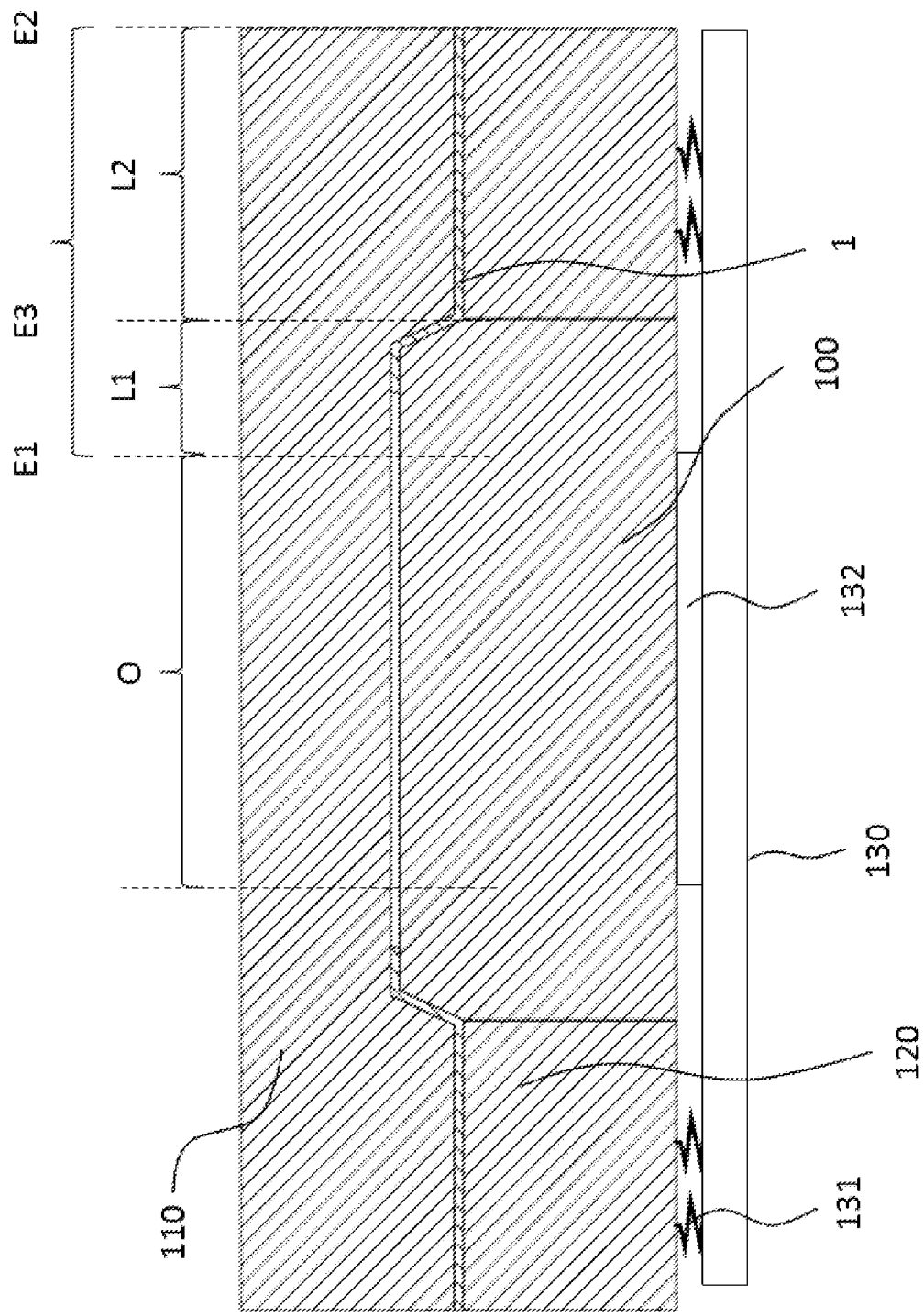

FIGS. 3A and 3B illustrate cross-sectional views related to a method for forming thermoplastic composites in accordance with the present invention. This method uses a mold that comprises a first mold part 100 and a third mold part 120 that is movably arranged around first mold part 100. Both first mold part 100 and third mold part 120 are connected to a supporting frame 130. More in particular, first mold part 100 is connected to supporting frame 130 using connecting member 132 and second mold part 120 is connected to supporting frame 130 using resilient elements 131 that are embodied as springs. The springs enable a relative movement between first mold part 100 and third mold part 130. The mold further comprises a second mold part 110 that is provided with a recess 111 in which first mold part 100 can be at least partially arranged.

FIG. 3A illustrates a thermoplastic composite 1 in the form of a sheet that has already been partially bent by mutually moving supporting frame 130 and second mold part 110. More in particular, at least one of supporting frame 130 and second mold part 110 can be driven by a driving system (not shown).

Figure 1A:
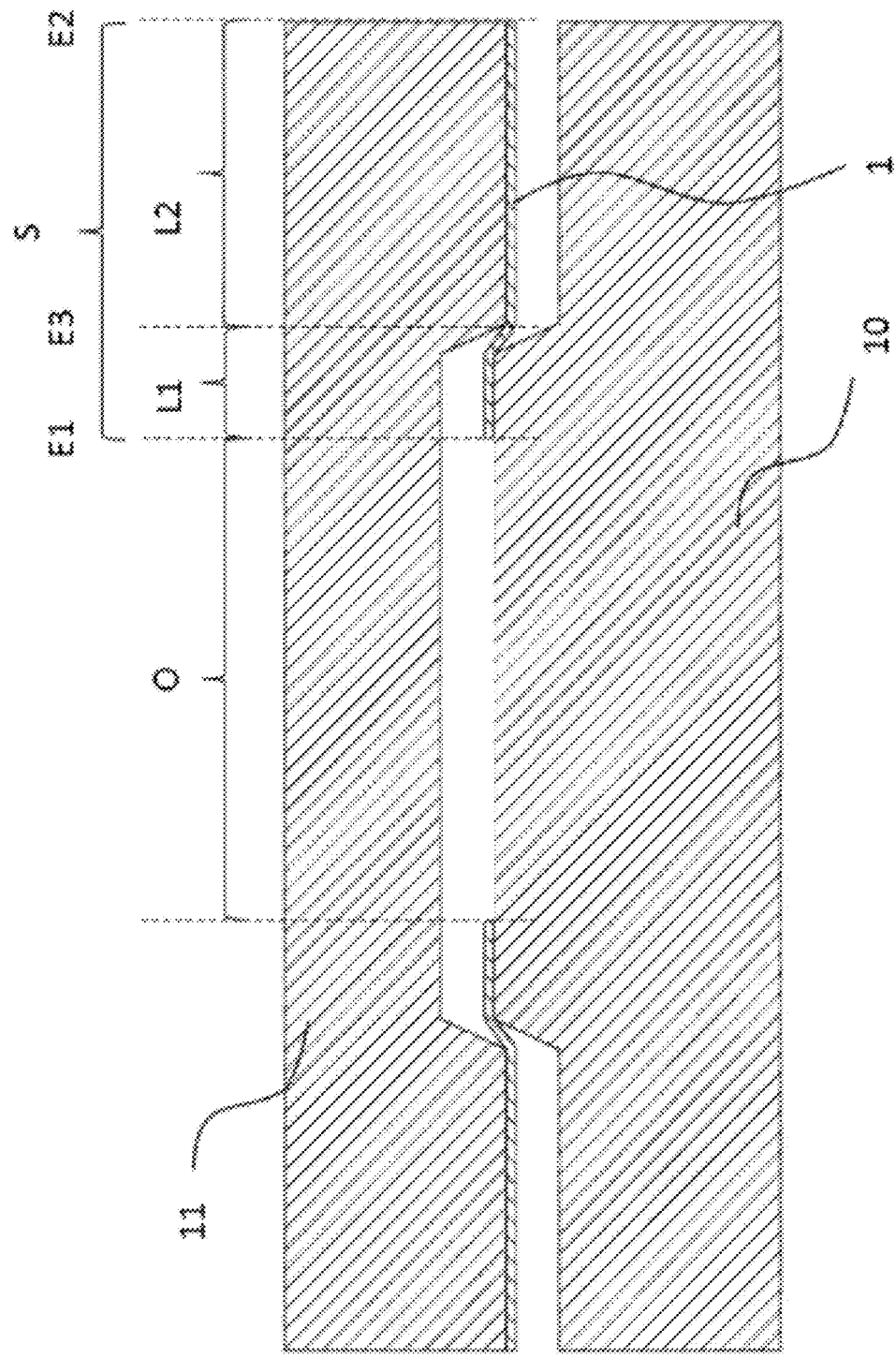
FIGS. 1A and 1B illustrate cross-sectional views related to a known method for forming thermoplastic composites.

Similar to thermoplastic composite 1 shown in FIG. 1A, thermoplastic composite 1 shown in FIG. 3A comprises a central opening O that is surrounded by a surrounding region S. Moreover, surrounding region S comprises an inner part L1 and an outer part L2. Further shown in FIG. 3A are inner edge E1 of inner part L1 and outer edge E2 of outer part L2.

In FIG. 3A, outer part L2 is clamped in between third mold part 120 and second mold part 110. Upon further mutual movement of second mold part 110 and supporting frame 130, springs 131 will compress further. In this manner, outer part L2 remains clamped.

In addition to recess 111, second mold part comprises an outer region 113 and an intermediate region 112 that connects recess 111 to outer region 113. Intermediate region 112 is chamfered and has a shape that is complementary to the chamfered edge of first mold part 100.

The forming of thermoplastic composite occurs mostly in the region between the chamfered edge of first mold part 100 and the chamfered intermediate region 112. During the mutual movement of second mold part 110 and supporting frame 130, more and more thermoplastic composite 1 is pulled into the region between the chamfered edge of first mold part 100 and the chamfered intermediate region 112.

When second mold part 110 and supporting frame 130 are brought even further together, the situation shown in FIG. 3B is obtained. As can be shown, inner edges E1 have moved outwardly, whereas outer edges E2 remained fixed due to the clamping. The movement of inner edge E1 is possible as inner part L1 is allowed to move relative to first mold part 100.

Figure 1B:
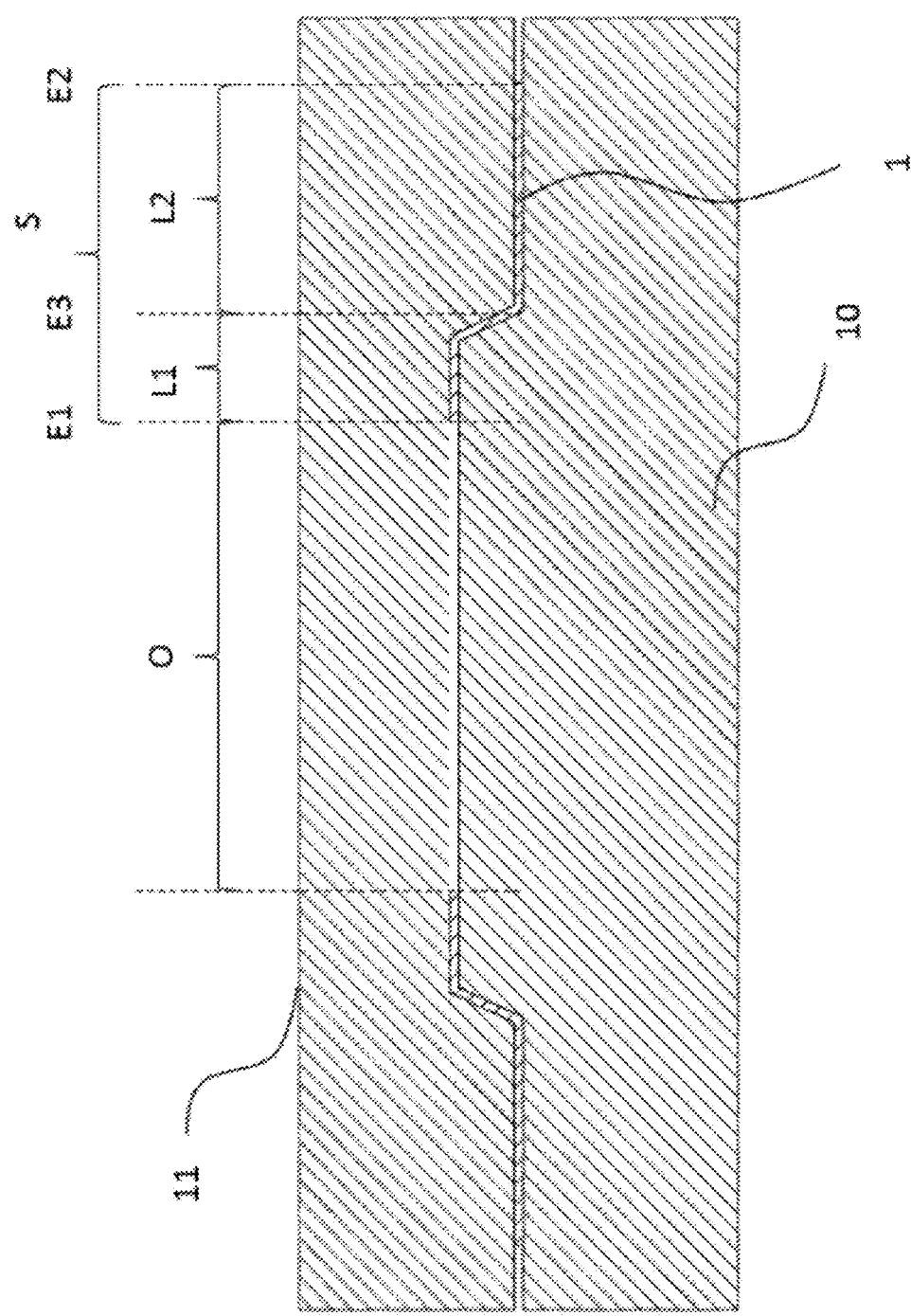
Figure 2A:
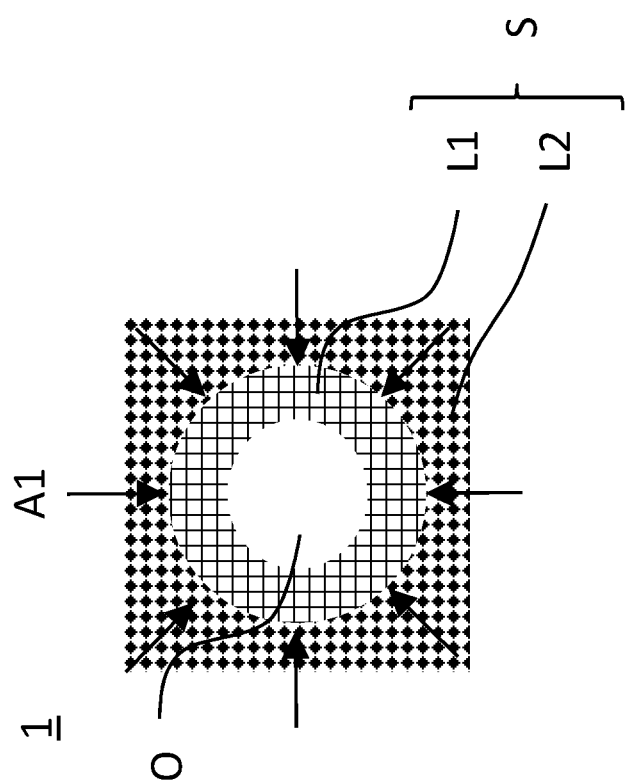
FIG. 2A illustrates a top view of a thermoplastic composite with central opening in which the movement of material during forming is illustrated when the known method for forming is applied.
Figure 2B:
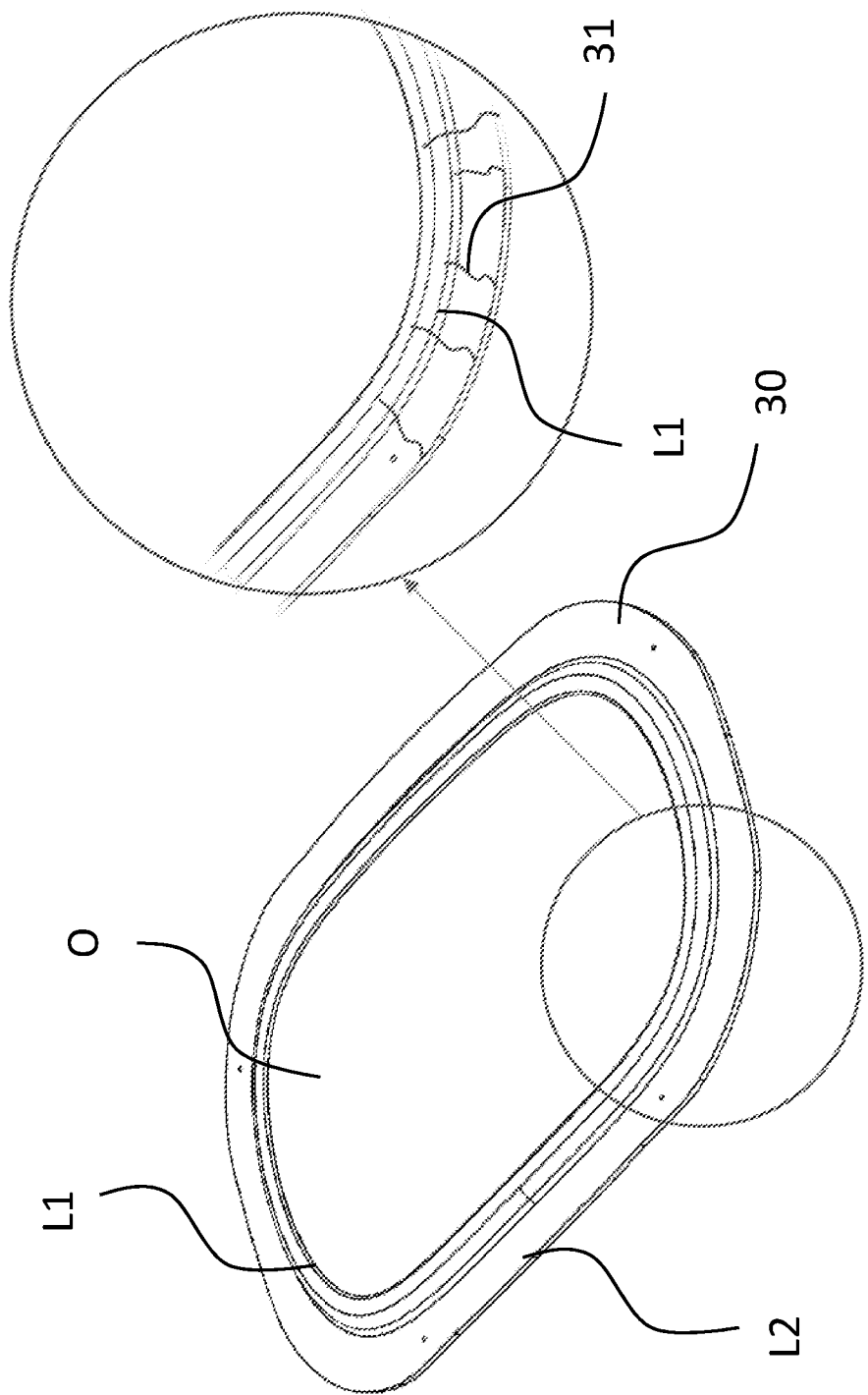
FIG. 2B illustrates the problem of wrinkling for a thermoplastic composite window frame when the known method for forming is applied.
Figure 2C:
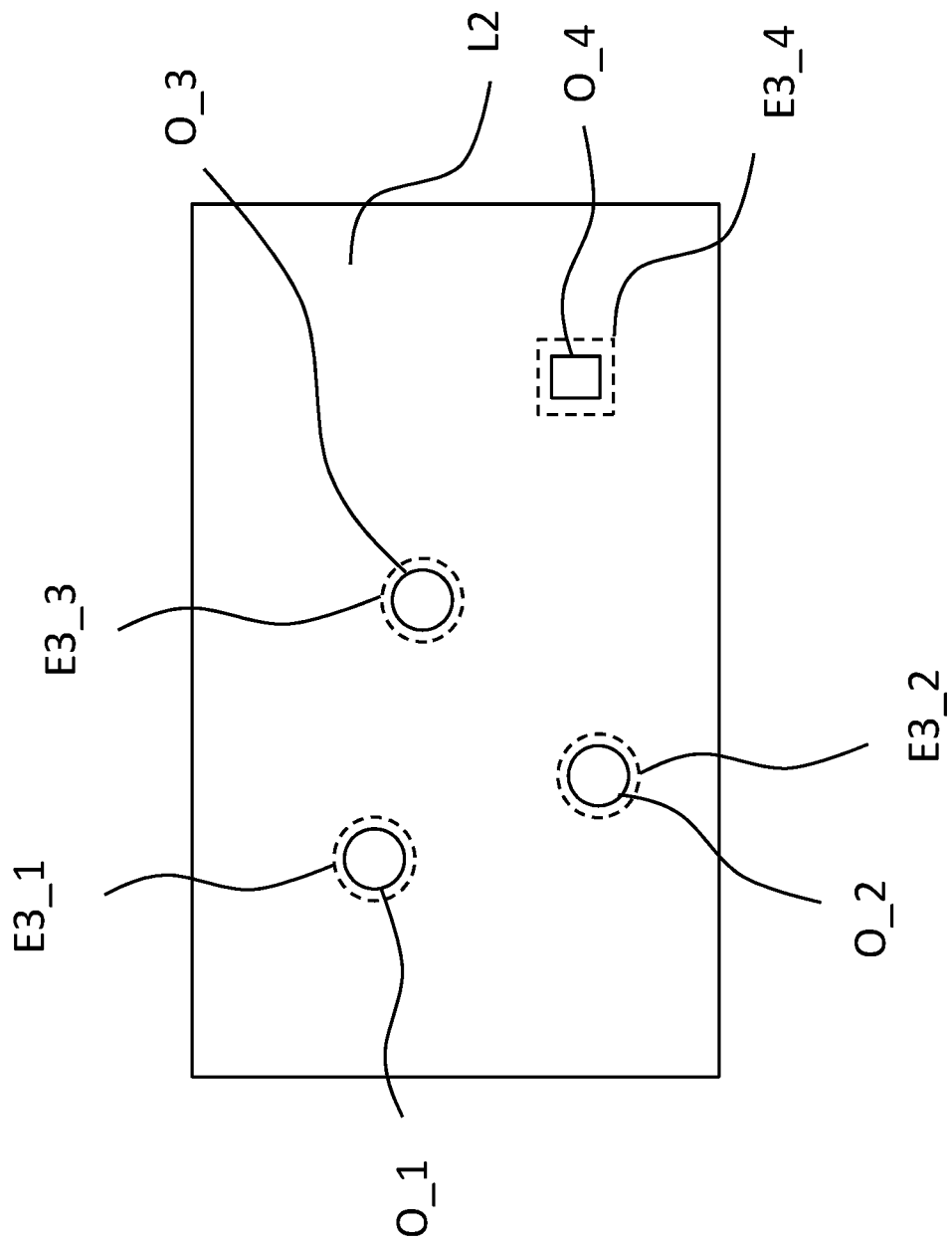
FIG. 2C illustrates an exemplary sheet of thermoplastic composite to be formed comprising multiple inner openings.
Figure 4:
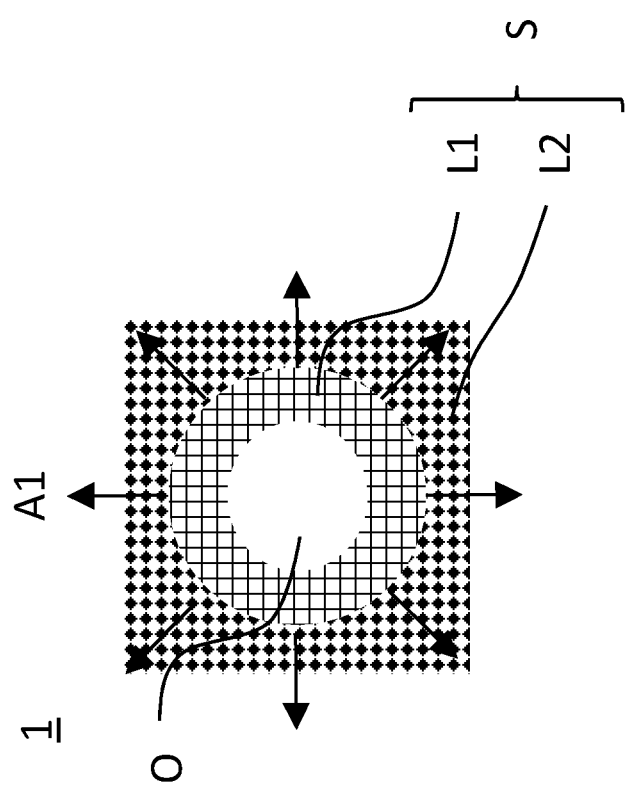
FIG. 4 illustrates a top view of a thermoplastic composite with central opening in which the movement of material during forming is illustrated when the method of FIGS. 3A and 3B is applied.

An important difference with the method illustrated in connection with FIGS. 1A and 1B is that according to the invention, thermoplastic composite 1 is pulled outwardly instead of inwardly. This difference can be observed in FIG. 4, where the outward flow of material is shown using arrows A1. An advantage of the outward flow is that material is no longer accumulated as the material moves to a region with a larger radius. Consequently, the risk of wrinkling of thermoplastic composite 1 is mitigated.

Similar to FIGS. 1A and 1B, the mold shown in FIGS. 3A and 3B is such that in the final position, thermoplastic composite 1 is fully engaged below and above thermoplastic composite 1. This allows a well-defined shape of the final product and facilitates the overall cooling of thermoplastic composite 1 to a temperature well below the melting temperature. The mold or one or more of the mold parts can be provided with heating means, such as heating coils, for heating the mold or mold parts. The heating is preferably such that the thermoplastic composite, which is heated before forming to a temperature above the melting temperature, is not cooled too rapidly as this would impede the forming as a result of the increased stiffness associated with solidification of the thermoplastic composite. On the other hand, the temperature of the mold or mold parts should not be too high as this would increase the time required for the thermoplastic composite to cool down sufficiently. It should be noted that the mold or mold parts are generally kept at a substantially constant temperature during the serial processing of multiple thermoplastic composites. As the mold has a substantial thermal mass, changing temperature of the mold or mold parts would require considerable time.

In the above, the present invention has been described using detailed embodiments thereof. However, the skilled person will appreciate that various modifications to these embodiments are possible without deviating from the scope of the invention which is defined by the appended claims.

For example, the present invention may be equally applied for forming a thermoplastic composite having multiple inner openings and a surrounding region that surrounds the multiple inner openings. In such case, the surrounding region comprises multiple inner parts directly adjacent the multiple inner openings, respectively, and a common outer part. A plurality of first mold parts can then be used for engaging the multiple inner parts, whereas the common outer part can be engaged using the second mold part. The method of forming such thermoplastic composite corresponds to that shown in FIGS. 3A and 3B with the exception that the steps shown in these figures are simultaneously or sequentially performed for each of the multiple inner openings. It should be further noted that the application is not limited to a particular shape or size of the first mold parts. For example, a height as measured in the direction of mutual movement between the first mold parts and the second mold part, or a width as measured perpendicular to this movement may differ among the various first mold parts.

The invention claimed is:

1. A method for forming a thermoplastic composite having one or more inner openings, comprising:
  heating the thermoplastic composite to a temperature above a melting temperature of a thermoplastic material in the thermoplastic composite;
  arranging the heated thermoplastic composite comprising one or more inner openings and a surrounding region that surrounds the one or more inner openings in a mold that comprises one or more first mold parts for the one or more inner openings, respectively, and an oppositely arranged second mold part, wherein the surrounding region comprises one or more inner parts directly adjacent the one or more inner openings, respectively, and a common outer part, each inner part having an inner edge, and the common outer part having an outer edge;
  engaging the one or more inner parts using the one or more first mold parts and engaging the common outer part using the second mold part; and
  mutually moving the one or more first and second mold parts thereby forming the one or more inner parts,
  wherein the mold further comprises a third mold part movably arranged around the one or more first mold parts, the method further comprising the step of clamping the common outer part in between the second and third mold parts during said mutually moving the one or more first and second mold parts while:
    allowing the one or more inner parts to move relative to the one or more first mold parts thereby increasing the one or more inner openings, respectively, and
    keeping the outer edge fixed in position relative to the second mold part and third mold part,
  wherein the one or more first and third mold parts are connected to a supporting frame, the mold further comprising one or more resilient elements arranged in between the supporting frame and the third mold part, and wherein said mutually moving the one or more first and second mold parts comprises mutually moving the second mold part and the supporting frame while the third mold part is pushed towards the supporting frame by the second mold part thereby compressing the one or more resilient elements, and
  wherein the one or more first, second, and third mold parts are heated to a temperature below the melting temperature of the thermoplastic material in the thermoplastic composite.

2. The method according to claim 1, wherein the third mold part is kept at a lower temperature than the one or more first mold parts.

3. The method according to claim 1, wherein said mutually moving the one or more first and second mold parts comprises:
  keeping the second mold part stationary and moving the supporting frame; or
  keeping the supporting frame stationary and moving the second mold part; or
  moving both the second mold part and the supporting frame.

4. The method according to claim 1 wherein the heated thermoplastic composite that is to be arranged in the mold is flat.

5. The method according to claim 1 wherein the thermoplastic composite is made from a consolidated stack of thermoplastic composite plies.

6. The method according to claim 1, wherein the formed thermoplastic composite is a window frame.

7. A molding system, comprising:
  a thermoplastic composite having one or more inner openings and a surrounding region that surrounds the one or more inners openings; and
  a mold for forming the thermoplastic composite, the mold comprising:
    one or more first mold parts and a second mold part in between which the thermoplastic composite can be arranged, wherein the surrounding region comprises one or more inner parts directly adjacent the one or more inner openings, respectively, and a common outer part, each inner part having an inner edge, and the common outer part having an outer edge,
  wherein the second mold part is configured for engaging the common outer part, respectively,
  wherein the one or more first and second mold parts are configured for allowing the one or more first and second mold parts to mutually move for the purpose of forming the one or more inner parts, wherein the mold further comprises a third mold part movably arranged around the one or more first mold parts, wherein the third mold part and the one or more first mold parts are configured for mutual movement enabling the outer part to be clamped in between the second and third mold parts during said mutually moving the first and second mold parts, the mold being further configured to, during the mutual movement of the one or more first and second mold parts, allow the one or more inner parts to move relative to the one or more first mold parts thereby increasing the one or more inner openings, respectively, and keep the outer edge fixed in position relative to the second mold part and third mold part, wherein the mold further comprises a supporting frame to which the one or more first and third mold parts are connected, wherein one or more resilient elements are arranged in between the supporting frame and the third mold part, wherein the supporting frame and the second mold part are configured for allowing mutual movement while the third mold part is pushed towards the supporting frame by the second mold part thereby compressing the one or more resilient elements, and wherein the mold is configured to heat the one or more first second, and third mold parts to a temperature below a melting temperature of the thermoplastic material in the thermoplastic composite, and to keep the second and third mold part at a lower temperature than the one or more first mold parts.

8. The molding system according to claim 7, wherein at most one of the second mold part and the supporting frame can be kept stationary while moving the remaining one(s) of the second mold part and the supporting frame.

9. The molding system according to claim 7, wherein the second mold part comprises one or more inner recesses configured for partially receiving the one or more first mold parts, respectively, an outer region for engaging the third mold part, and an intermediate region connecting the one or more inner recesses and the outer region, wherein the intermediate region and an edge of the one or more first mold parts are chamfered, wherein the chamfering of the intermediate region is arranged opposite to the chamfering of the edges of the one or more first mold parts.

* * * * *